United States Patent [19]
Washino

[11] Patent Number: 5,627,898
[45] Date of Patent: May 6, 1997

[54] SIGNAL DISTRIBUTION WITH USER-CONFIGURABLE GROUND-LOOP CONTROL

[76] Inventor: Kinya Washino, 80 Hamilton Ave., Dumont, N.J. 07624

[21] Appl. No.: 154,599

[22] Filed: Nov. 19, 1993

[51] Int. Cl.$^6$ .................................................. H04B 3/00
[52] U.S. Cl. .................................. 381/77; 381/124
[58] Field of Search ............................. 324/509, 538; 327/108, 291, 295, 302, 304; 381/94, 77, 124, 80, 81; 330/258; 361/111; 341/157; 455/8; 359/143

[56] References Cited

U.S. PATENT DOCUMENTS

| | | | |
|---|---|---|---|
| 4,320,388 | 3/1982 | McCarthy et al. | 340/825.54 |
| 4,429,187 | 1/1984 | Butcher | 381/80 |
| 4,847,507 | 7/1989 | Matson et al. | 359/143 |
| 4,979,218 | 12/1990 | Straham | 381/94 |
| 4,996,531 | 2/1991 | Kotter et al. | 341/157 |
| 5,247,297 | 9/1993 | Seabury et al. | 340/934 |
| 5,313,524 | 5/1994 | Van Hulle et al. | 381/77 |

*Primary Examiner*—Curtis Kuntz
*Assistant Examiner*—Xu Mei

*Attorney, Agent, or Firm*—Gifford, Krass, Groh, Sprinkle, Patmore, Anderson & Citkowski

[57] ABSTRACT

A signal distribution system includes module-receiving means whereby a user may select isolation circuitry to eliminate ground-loop-induced interference. The invention is particularly suited to signal distribution systems characterized in having large numbers of equipment pieces interconnected over communication paths of a distance conducive to ground-loop effects, such as configurations associated with audio and/or video magnetic-tape duplication. In the preferred embodiment, each piece of equipment susceptible to such ground-loop effects includes on a primary circuit board within its enclosure a module-receiving connector to which one of a plurality of user-selectable circuitry-containing modules attaches. The equipment may be shipped with a module in the form of jumpers, and this module may be left in place or later added in the event that no interference is apparent. However, in accordance with the level of interference observed, the user may replace the jumper module with a module containing various types of isolation circuitry, including transformers and optoelectronic isolation means, the latter of which may be used in conjunction with cabling or communication paths in the form of optical fibers.

15 Claims, 4 Drawing Sheets

SIGNAL DISTRIBUTION WITH USER-CONFIGURABLE GROUND-LOOP CONTROL

FIELD OF THE INVENTION

This invention relates generally to signal distribution, and, in particular, to a system wherein audio, video, or remote control signals may be isolated with user-selectable modules to minimize disruption or distortion caused by electrical ground loops.

BACKGROUND OF THE INVENTION

As the commercial market for magnetic recordings has flourished, the size and relative complexity of the facilities associated with duplicating such recordings has increased dramatically. Previously, limitations in the size of such facilities and the recording methods employed often made it unnecessary to deal with the electrical problems involved with interconnecting vast arrays of recording equipment, in some cases as many as tens of thousands of machines. However, the increased size of modern facilities, together with the improved quality of today's recording equipment, make it mandatory to ensure that the signals associated with such recording processes are kept as free as possible from any form of interference or distortion.

Whenever two pieces of electrical equipment are connected with conducting wires, it is possible that there will be a difference in the ground potential of the units, which can result in a flow of electrical current between the two ground potentials, typically referred to as a "ground-loop". With alternating current supplied at a frequency of 50 Hz or 60 Hz, these low frequencies, when manifested as an audio signal, are typically referred to as "hum." On a video screen, the result as may be seen as dark horizontal "hum bars" across the picture typically moving slowly from the bottom of the picture towards the top.

There are several methods for eliminating such undesirable effects in large systems, but these methods are based on cancellation of the interference, rather than prevention. In the case of audio signals, transformers or differential-input operational amplifiers are frequently used. Such approaches are effective if the signal distribution system employs a balanced-line wiring scheme, wherein the same signal is applied to two wires, with the phase of the signal on one of the wires being reversed. At the receiving end, a transformer or differential-input amplifier is employed to effectively combine the two signals, resulting in a signal with twice the amplitude. External signals appear as interference present on both wires, in equal amplitude, and having the same phase. As such, the resulting differential-input method leads to a cancellation of the interference signal. In addition, the two wires are typically carried in a shielded cable, in which the insulated signal wires are surrounded by a conductive-mesh or wrapped by a conductive-foil, thereby providing an effective electrostatic shield. To prevent the flow of any ground-loop currents, this shield is only connected at one end of the cable.

Unfortunately, video and other high frequency signals are typically distributed in an unbalanced, or "single-ended," wiring scheme, carried by coaxial cables. In this case, interconnection of two pieces of equipment may result in an electrical current flowing through the shield of the coaxial cable, producing the "hum" effects described above. In some cases, the connection of unbalanced wiring will even cause equipment using balanced wiring to exhibit hum, due to ground-loop effects from other wiring connections. The most common method of dealing with this problem involves the use of a "hum-stop" or "hum-canceling" coil, which consists of a coil of coaxial cable tightly wound to produce cancellation of the low frequency power components on the signal lines.

Such coils are expensive to manufacture with wide band frequency response, and invariably produce an attenuation of higher frequencies, due to the long length of cable contained in the coil. Compensation of this frequency loss requires extra circuitry, either as a pre-emphasis to the signal at the source end of the cable, or else as post-emphasis to the signal at the receiving end. In either case, there may be some degradation of the signal-to-noise ratio, and the additional circuitry may introduce non-linear distortions that can affect the differential phase or gain, or other characteristics, of the signal path. Occasionally, various remote control signals are also carried through unbalanced cables, and these may produce ground-loop problems as well. A carefully designed method of signal distribution which prevents these ground-loop problems in an economical way will be of benefit to the users of even small size duplication systems.

SUMMARY OF THE INVENTION

This invention provides a signal distribution system through which a variety of signals may be carried between a number of pieces of electronic equipment such as distribution amplifiers, signal switchers, and signal processors, without incurring signal disruptions due to the ground-loop effects. Several methods are presented by which ground-loop effects can be avoided, including the use of isolation transformers, semiconductors optical-isolators, and special instrumentation-grade balanced isolation amplifiers. Equipment taking advantage of these approaches include provisions by which the various methods could be interchanged or bypassed, using, for example, plug-in modules on a main printed circuit board.

DETAILED DESCRIPTION OF THE PREFERRED EMBODIMENT

Figure 1A:
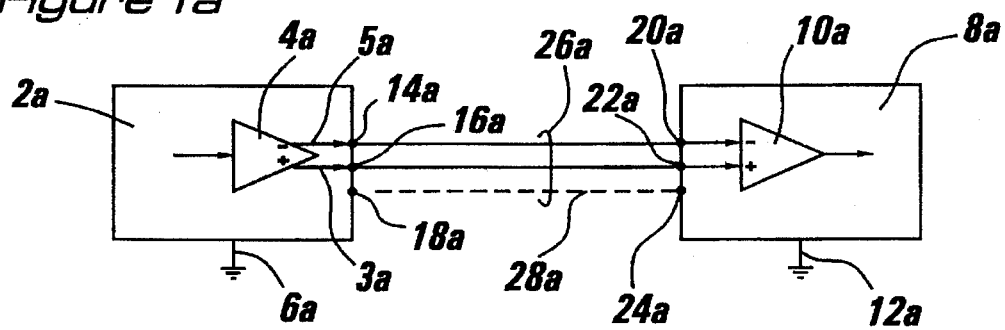
FIG. 1a is a schematic diagram showing a balanced-line signal connection between two pieces of equipment.

Various problems relating to signal distribution which are addressed by this invention are illustrated in FIGS. 1a, 1b, 1c and 1d. These drawings represent, respectively, a balanced-line connection system, a conventional unbalanced-line connection system, and two different unbalanced-line connection systems. In FIGS. 1a, 1b, 1c and 1d, a first electronic apparatus, shown generally at 2, is connected to a second electronic apparatus, shown generally at 8. The mechanical chassis of the first apparatus is connected to the power-line ground as shown at 6; whereas the mechanical chassis of the second apparatus is connected to its power-line ground as shown at 12.

For the purposes of this description, it may be assumed that the two electrical apparatus and their power connections are separated by a distance sufficient to be susceptible to the kinds of effects to be discussed. In each case, there is a signal transmitting circuit, shown generally at 4, and a signal receiving circuit, shown generally at 10. Transmitting apparatus 2 has isolated external connections at 14 and 16, and a connection at 18 that is electrically connected to the mechanical chassis and the power line ground 6. Receiving apparatus 8 has isolated external connections at 20 and 22, and a connection at 24 that is electrically connected to the mechanical chassis and the power line ground 12. The two apparatuses are connected by a cable comprising one or more wires 26, surrounded by an electrostatic shield 28, comprised of a copper mesh or conductive foil wrapper.

In FIG. 1a, the first apparatus has balanced-line driver circuitry, shown at 4a, which generates two identical signals. The in-phase signal 3a is denoted at the +output; the inverted, or opposite-phase, signal 5a is denoted as the −output. The two signals are carried out of the apparatus through connections 16a and 14a, which are electrically insulated from the mechanical chassis 2a and its electrical ground connection 6a. A third connection at 18a is electrically connected to the chassis, as shown.

In practice, connections 14a, 16a, and 18a are typically incorporated into a single, multiple-conductor output connector assembly. Wire(s) 26a, surrounded by electrical shield 28a, carry the two signals to the second apparatus through connections 20a and 22a, carry the two signals to the second apparatus through connections 20a and 22a, which are electrically isolated from the mechanical chassis and its electrical ground connection. The shield is electrically connected to the third connection 24a, which is shown as being electrically connected to the chassis and its ground connection 12a. As in the first electronic apparatus 2a, the connections 20a, 22a, and 24a are typically incorporated into a single, multiple-conductor input connector assembly.

The second electronic apparatus 8a has balanced-line receiver circuitry, shown as 10a, which takes as its input the two signals of opposite phase from the first apparatus. Because the shield wire 28a is only connected at one end of the cable, it is impossible for electrical currents to flow through the shield, thereby avoiding ground-loop problems.

Figure 1B:
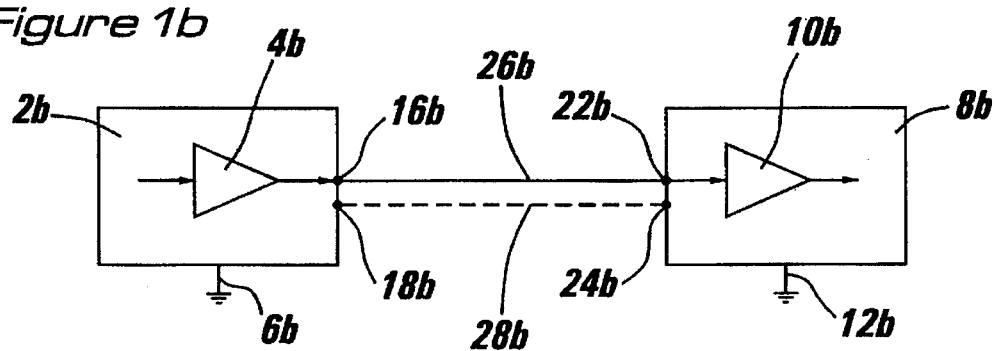
FIG. 1b is a schematic which illustrates an unbalanced-line signal connection between two pieces of equipment.

In FIG. 1b, first apparatus 2b and second apparatus 8b are interconnected in the usual unbalanced-line configuration, as is typical for video or other signals carried by coaxial cables. In this case, output circuitry 4b produces a signal carried through electrically isolated connection 16b, with connection 18b electrically connected to the mechanical chassis and its ground connection 6b. Wire 26b and its shield 28b carry the signal to the second apparatus, through electrically isolated connection 22b and connection 24b, the latter being connected to the chassis and ground 12b. Receiver circuitry 10b takes its input from electrical connection 22b, similar to the configuration described with reference to FIG. 1a. However, unlike the balanced-line configuration, the unbalanced-line configuration has the shield 28b connected at both ends of the wire, thereby allowing the flow of electrical current between apparatuses 2b and 8b, which, in turn, allows ground-loop effects.

Figure 1C:
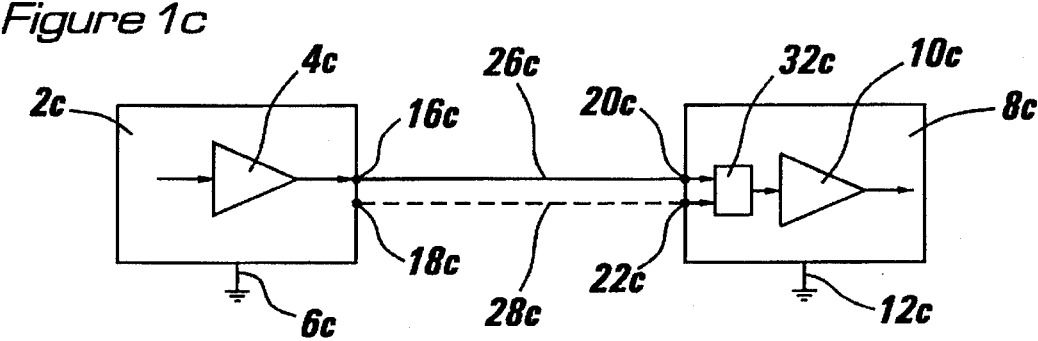
FIG. 1c is a schematic of an unbalanced-line signal connection between two pieces of equipment, wherein an isolation circuit has been installed in the receiving apparatus.

FIG. 1c also illustrates first apparatus 2c and second apparatus 8c being interconnected in the usual unbalanced-line configuration. Output circuitry 4c produces a signal carried through electrically isolated connection 16c, with connection 18c electrically connected to the mechanical chassis and its ground connection 6c. Wire 26c and its shield 28c carry the signal to the second apparatus, through electrically isolated connections 20c and 22c. Isolation circuitry 32c has inputs from electrical connections 20c and 22c, this circuitry functioning in a differential-amplifier type configuration.

In practice, specific implementations will depend upon the frequency response of the particular signal to be isolated. For lower frequencies (up through the audio band of 20 kHz) this isolation circuitry may be implemented with high-quality audio isolation transformers. For higher frequencies (up through the video band of approximately 6 MHz) commercially available wide-band optical-isolators, such as the transistor-output Hewlett-Packard HCPL-4562 may be used. For digital signals, more conventional optical-isolators, such as the Quality Tech 740L6000, are applicable. Regardless of the specific circuitry utilized, the output of this circuit is then connected to receiver circuitry 10c. Because there is no direct connection between the chassis or electrical power systems of the two apparatuses, ground-loop effects are prevented.

Figure 1D:
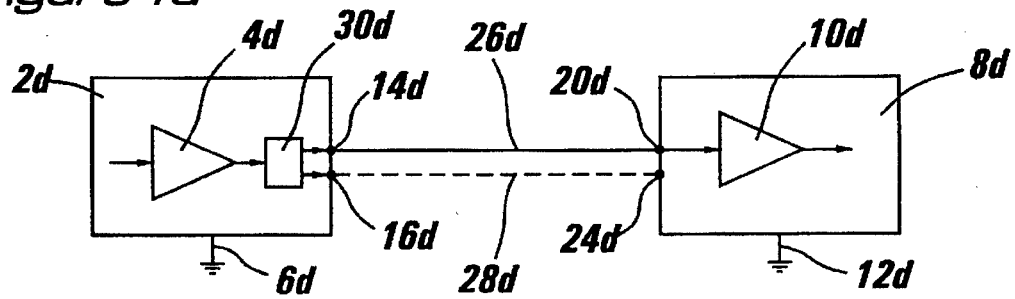
FIG. 1d is a schematic of an unbalanced-line signal connection between two pieces of equipment, wherein an isolation circuit has been installed in the transmitting apparatus.

It should be noted that, although the system shown in FIG. 1c implements the isolation circuitry at the receiving apparatus, the circuit will be equally effective if implemented at the transmitting apparatus, as shown in FIG. 1d, simply by incorporating the circuitry 30d after the output circuitry 4d and before the output connections 14d and 16d. In this case, similar to that in FIG. 1a, both of the output connections 14d and 16d are electrically isolated from the chassis electrical ground connection 6d, but connection 24d on the receiving apparatus now connects the shield 28d to the chassis electrical ground 12d. While it is practical to provide isolation for both the transmitting apparatus and the receiving apparatus, the invention anticipates the placement of the isolation at either end, even if such circuitry is not part of the circuitry of either apparatus itself. In addition, for certain applications, it will be advantageous to implement the isolation circuitry by employing a fiber-optic transmission system. In this case, the output circuitry 4 located in the transmitting apparatus 2 will include a fiber-optic transmitter, and the receiving circuitry 10 located in the receiving apparatus 8 will include a fiber-optic receiver.

In the physical implementation of these isolation methods, the circuits for either the input isolation or the output isolation are mounted on a separate interface circuit board, adapted for interconnection to a main circuit board, or "mother-board," which contains the remainder of the active circuitry. For those applications where no isolation is required, as, for example, two distribution amplifiers mounted in close proximity in the same equipment rack, the mother-board would have the interconnecting contacts directly connected from the input connector terminals on the mother-board to the input circuitry connectors on the mother-board, thereby effectively bypassing the isolation circuit provisions. Alternatively, the user may select an interface circuit board which simply contains jumpers instead of a module containing the isolation circuitry.

In the case where the isolation feature is to be activated, the user selects an appropriate interface circuit board from among the various input or output options previously described, installing it on the mother-board by removing the bypass jumpers and plugging the interface card into the interconnection contacts provided thereby. The physical contacts would be selected from one of the commercially available circuit-board-connectors selectable, for example, from those offered by Molex, Inc. or Amp Corp.

The present invention is applicable to any type of electrical signal distribution system which may be susceptible to ground-loop effects. It is particularly valuable when used in conjunction with an audio or video duplication system, since, in such a system large numbers of hardware units must be interconnected, often remotely, thus raising probability that ground-loop interference effects will become apparent. However, although the discussion which follows is directed toward such a signal-distribution system, it should be understood that the present invention is by no means limited to such an application. Other applications include signal distribution in association with radio or television broadcasting, signal distribution associated with telephony, signal distribution associated with radar systems, and signal distribution associated with computer networking, to name just a few other potential applications.

Figure 2:
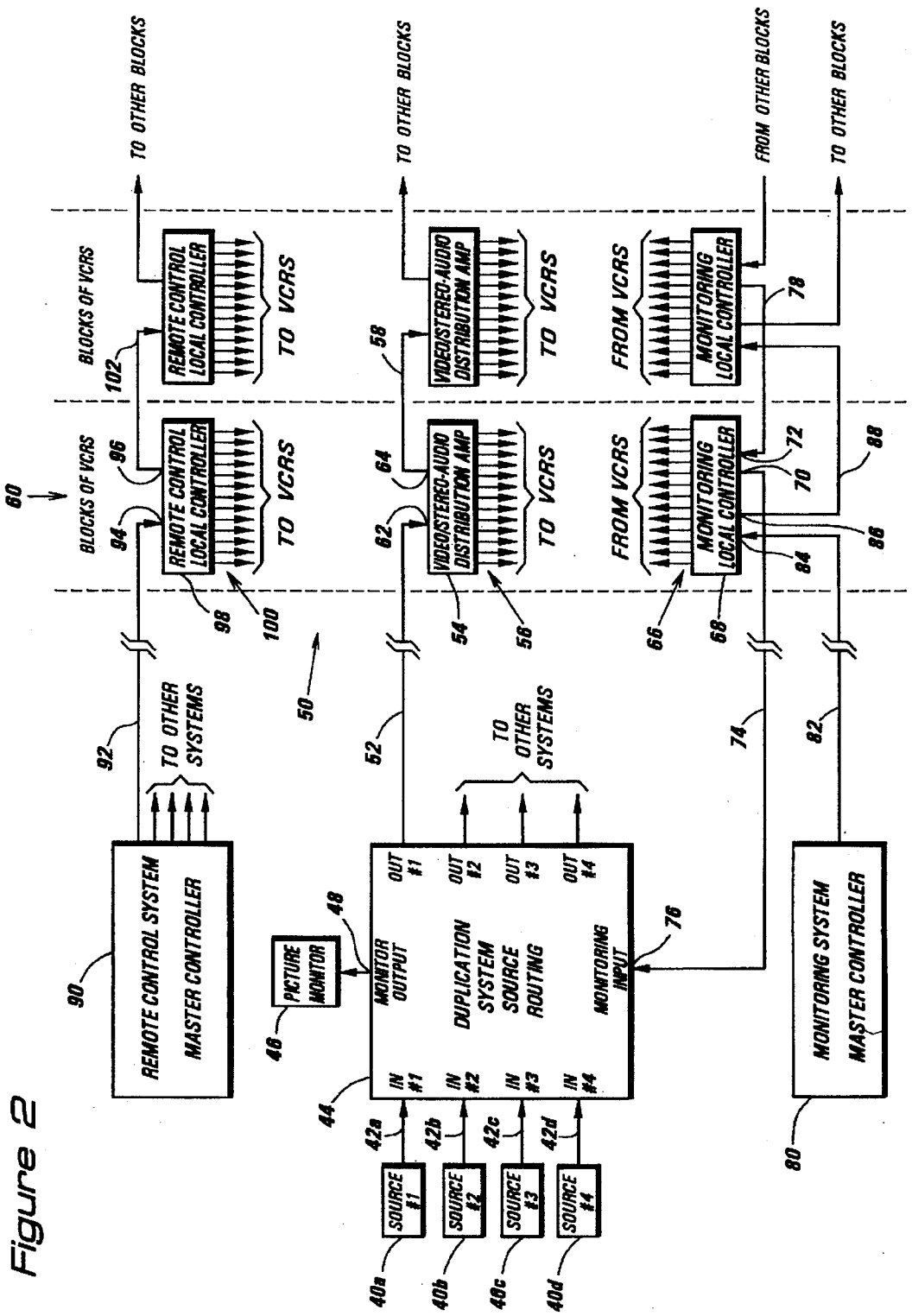
FIG. 2 shows in block-diagram form, a complete system for signal distribution, control, and signal monitoring in a video duplication facility configured in accordance with the present invention.

FIG. 2 shows a duplication system wherein signal distribution according to this invention has been implemented. A plurality of audio and/or video sources 40 are connected through audio and/or video cables 42 to the duplication system source routing unit 44. The sources 40 may be independently selectable for connection to a plurality of duplication systems, of which one typical system is shown in detail in the area generally indicated at 50. In practice, it is common for these duplication systems which are susceptible to ground-loop effects to be located in an area physically remote from the various pieces of control and monitoring equipment.

Under normal circumstances, any required isolation circuitry is physically located at the receiving end of the audio and video interconnection cables 52. Since the sources 40 consist of circuitry proximate to the duplication system source monitoring unit 44, it is generally not required that this unit have isolation circuitry; however, this unit also has provisions for inclusion of such circuitry, if desired or if required by the circumstances of the system installation.

As selections are made, and during the duplication process, signal paths may be monitored, using internal audio meters (not shown) on the front panel of the duplication system source monitoring unit 44, and by way of the external video monitor 46, from the monitor output 48. Additionally, this unit makes it possible to perform certain production effects, such as mixing of sources or switching between sources.

A typical duplication system 50 will generally be comprised of a number of "blocks," each block including a number of duplication recorders. A typical block is shown in the general area indicated at 60. In practice, the number of recorders in a block will depend on several factors, including the size of the facility, the size of an individual duplication system, and the number of outputs provided by the video/stereo-audio distribution amplifier 54. In the system shown, the audio and video cables 52 connect to the video/stereo-audio distribution amplifier 54 through input connectors 62. In the preferred embodiment, the isolation circuitry for the various unbalanced-line signals is included as part of the input circuitry of the video/stereo-audio distribution amplifier, using one of the techniques previously described; the amplifier provides a plurality of outputs 56 to the video recorders in the block so that each recorder receives all of the audio and video signals provided to the block. The signals of audio and video cables 52 are then "looped through" to the video/stereo-audio distribution amplifier in the next block, from connectors 64 and via audio and video cables 58.

When a monitoring system is implemented, the audio and video outputs sets 66 for each recorder in a block are connected to a monitoring local controller 68, which is capable of selecting one set of input signals for a particular recorder and connecting it to a set of output connectors 70; audio and video signals from the next block are accepted via cables 78 and connectors 72. these signals are then carried by audio and video cables 74 to the duplication system source routing unit 44, via monitoring input connectors 76, where they may be tested using internal audio meters and the external video monitor 46.

To prevent ground-loop problems, the signal inputs to the duplication system source routing unit may be provided with the same unbalanced-line isolation circuitry previously described. Control signals for the selection of (1) the desired monitoring local controller for a block and (2) the individual recorder within that particular block, are generated from the central control area, typically physically located proximate to the duplication system source routing unit 44, by the monitoring system master control unit 80. The control signals travel from the monitoring system master control unit to the monitoring local controller via cable 82 and connector 84 after which the signal is "looped through" to the next block via connector 86 and cable 88.

The monitoring system master control unit may be optionally equipped with provisions to perform automatic scanning of the various returned signals, starting with the first duplication recorder connected to the monitoring local controller in the first block, and then switching to the next duplication recorder in the block until the last duplication recorder in the first block, and then switching to the next duplication recorder in the block until the last duplication recorder in the first block has been selected for monitoring; at which time the unit will continue to the next monitoring local-controller in the next block, and sequentially switch through the duplication recorders in that block. When all of the recorders have been checked, the monitoring system master control unit then repeats the operation from the beginning, or switches to a different duplication system and perform a similar sequence.

When a remote-control system for duplication recorders is implemented, a remote control system master controller unit 90 typically is physically located proximate to the duplication system source routing unit, and is capable of controlling a plurality of duplication systems. For the particular duplication system 50, the control signals from this unit are carried to the remote control local-controller 98 via cable 92 and input connector 94. These remote control signals are "looped through" to the remote control local-controller in the next block via connector 96 and cable 102. To avoid ground-loop problems, the input circuit of the remote control local-controller will have isolation circuitry. Each of the duplication recorders is given remote control signals by way of remote control cables 100; as various models of recorders require different types of input control signals, such as parallel signal lines, serial data, or serial data via an infrared remote control, it generally will be necessary for the remote control local-controller to convert the remote control command signals from the remote control system master controller into the format required by the particular type of recorders attached to the remote control local-controller.

Figure 4:
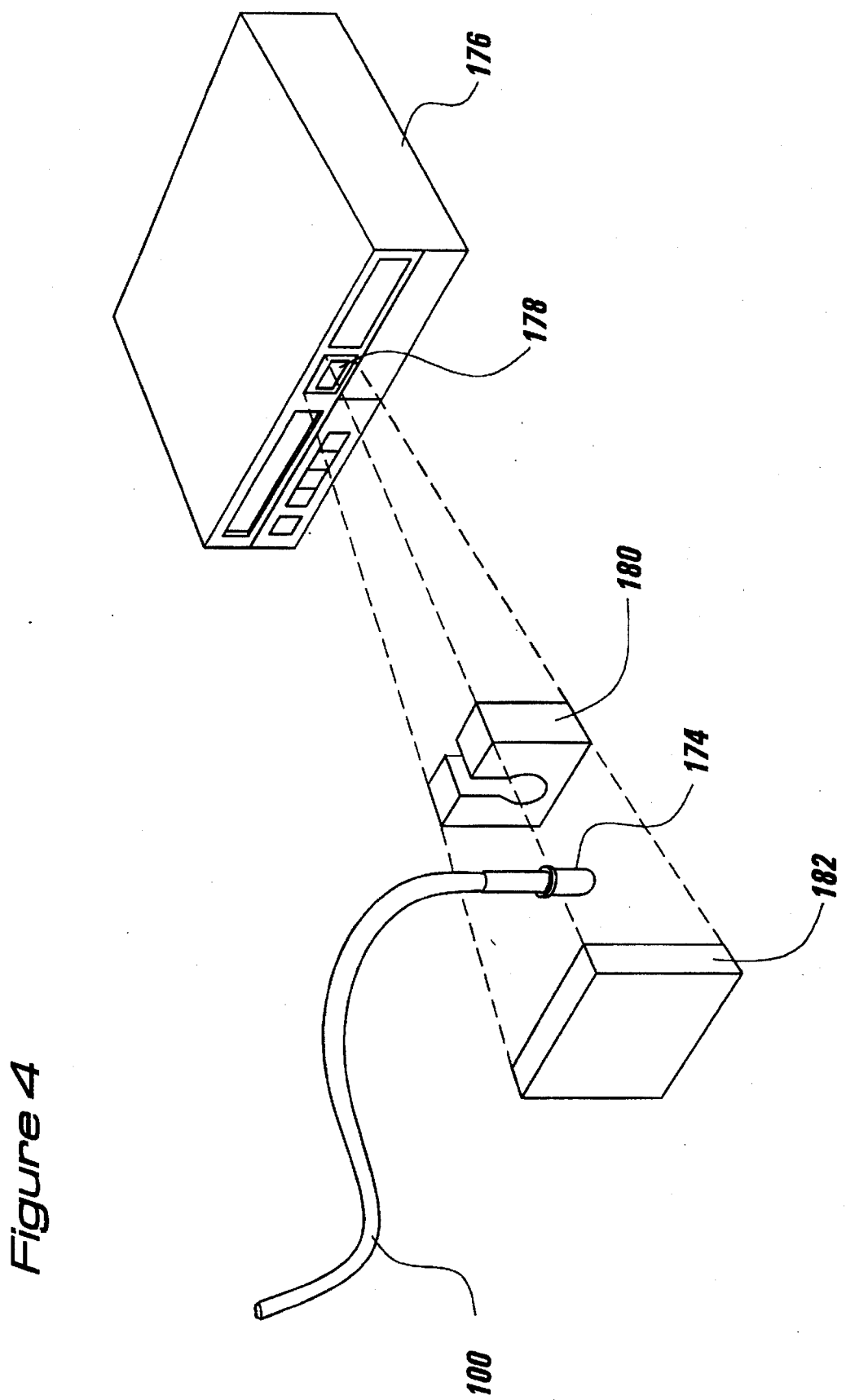
FIG. 4 is a drawing which depicts the physical attachment of remote-control LED interface cable to a VCR.

These are various ways to perform this conversion, which may be effected by dedicated circuitry, special plug-in circuit boards, or incorporation of the actual remote control units supplied by the manufacturer for use with the particular model of recorder. In this case, the manufacturer's unit is physically disassembled, and the electronic circuit board removed from its casing; this circuit board is then wired so that its push-button operations are simulated through the use of electrical contacts or signals generated internally by the remote control local-controller. The output signals from this circuit board are then either transmitted directly to the duplication recorder through its remote control input, or else the circuit board is wired to convey its signal to an infrared light-emitting-diode, or LED 174 as shown in FIG. 4. This LED is then affixed to the front of the recorder 176 so as to direct its signals into the wireless-remote-control-receiver 178; by using a holder comprised of the two pads of a "Velcro" fastener system which is comprised of a notched pad 180 affixed to the VCR at the wireless remote-control receiver 178 and a removable covering pad 182, it is possible to detach the LED unit from the recorder for servicing.

Figure 3:
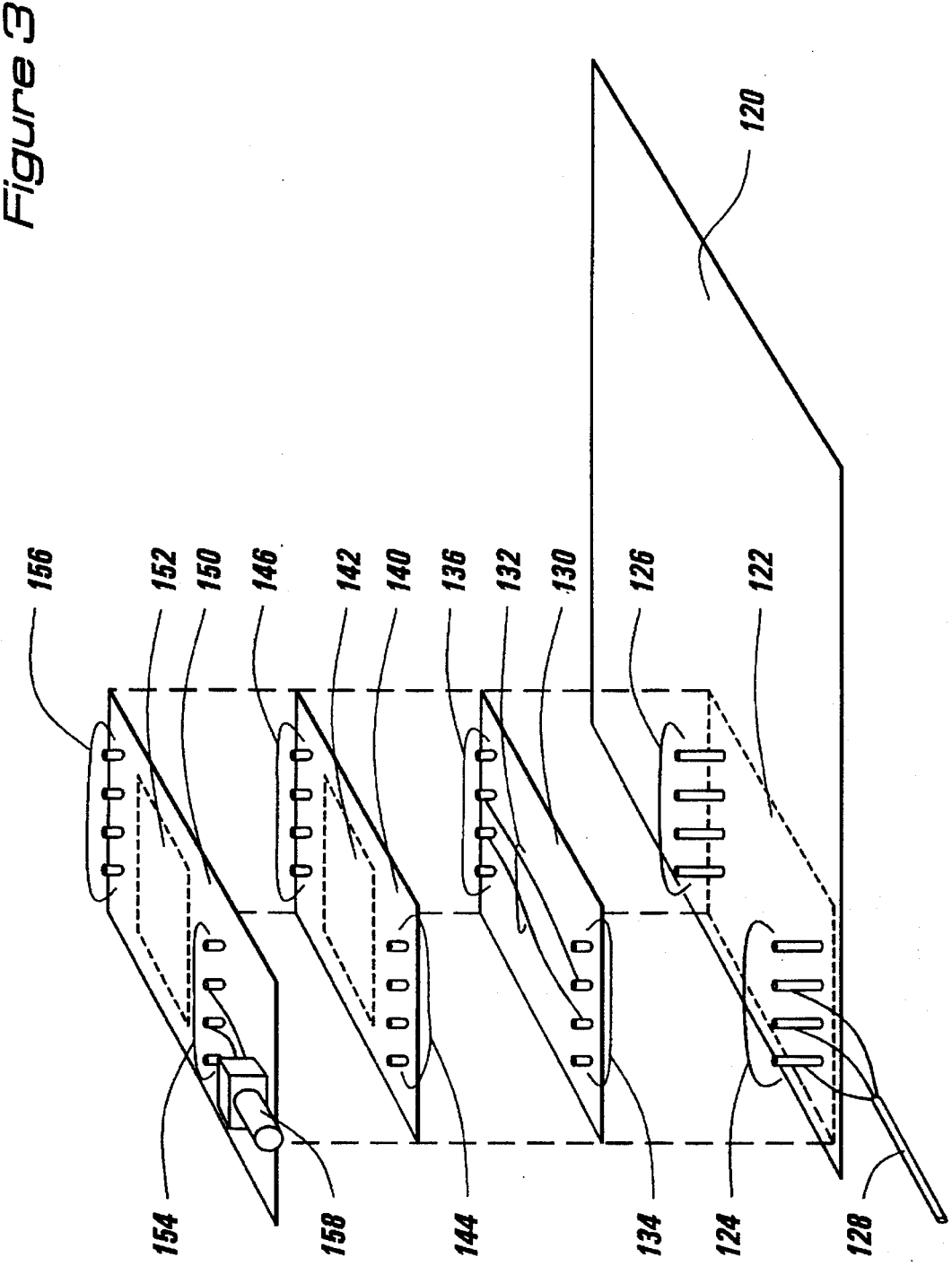
FIG. 3 is a drawing which depicts a mother board incorporating circuitry-receiving means.

FIG. 3 shows various possible mechanical configurations for the interconnection of isolation modules. A main circuit board or "mother-board" 120 has an area 122 provided as part of the input or output circuitry. Interconnection pins 124 are designated for interface to external circuitry or connectors, while interconnection pins 126 are designated for interface to internal circuitry on the mother-board. In the typical application, a multi-conductor cable 128 will carry signals between an external connector mounted on the equipment chassis (not shown) and the mother-board. For the case wherein no isolation circuitry is desired for an individual input signal or output signal, a specially constructed module 130 is designed to plug directly into the mother-board interconnection pins, with interconnection contacts 134 connecting to pins 124 and interconnection contacts 136 connecting to pins 126. Jumper wires 132 provide direct interconnection between contacts 134 and contacts 136, effectively connecting the interconnection pins 124 directly to interconnection pins 126. As an alternative, the interconnection pins 124 on the motherboard may be jumpered directly to interconnection pins 126, thereby eliminating the need for the separate module 130. As a further alternative, printed circuit board traces could perform this interconnection, with this path being broken by cutting traces or removing jumpers when a module is installed.

In the case where isolation circuitry is desired, a module 140 provides interconnection contacts 144 for the external connection pins 124 and contacts 146 for internal circuitry connection pins 126. The area designed as 142 contains an isolation circuit selected from among one of those previously described, and depending on the application, may provide either input or output isolation.

In an alternative embodiment, FIG. 3 shows how a module 150 may have the external connector 158 incorporated as part of the module itself. The size of the module is adjusted as shown to fit the physical requirements of the chassis, so that the connector may be physically attached to the chassis after the module has been mounted on the mother-board. As in the case of the alternative module 140, there is an area designated 152 containing an isolation circuit selected from among one of those previously described, and depending on the application, the module may provide either input or output isolation. In this case, the multi-conductor interface cable 128 would be unnecessary.

I claim:

1. In an audio/video duplication facility including a source routing unit having a plurality of inputs and outputs, the source routing unit being operative to receive a signal at one of the inputs and route the signal to one or more of the outputs, and at least one distribution amplifier having an input to receive a signal from an output of the source routing unit and distribute the signal to a block of recording devices, a signal distribution system including user-configurable means to cancel ground-loop-induced interference, the system comprising:

a monitoring local controller associated with each block of recording devices, the monitoring local controller being operative to receive a monitor signal from one or more of the recording devices within a particular block and route the monitor signal to a monitor output;

a monitor input on the source routing unit to receive the monitor signal from the monitoring local controller and output the signal to a monitoring device;

isolation circuitry; and isolation circuitry receiving means associated with each of the following:
each output of the source routing unit,
the input to each distribution amplifier,
the output of the monitoring local controller, and
the input to the source routing unit; and wherein the isolation circuitry is user-selectable in order to minimize the ground-loop-induced interference, if present in the system.

2. The signal distribution system of claim 1 wherein the isolation circuitry includes an isolation transformer.

3. The signal distribution system of claim 1 wherein the isolation circuitry includes an optoelectronic isolator.

4. The signal distribution system of claim 1 wherein a distribution amplifier may be connected to the source routing unit through a fiber-optic cable, in which case the isolation circuitry associated with the source routing unit output includes a light emitter and the isolation circuitry associated with the distribution amplifier input includes a light detector, the emitter and detector being configured to communicate via the fiber-optic cable.

5. The signal distribution system of claim 1 wherein the user-selectable isolation circuitry includes a jumper which a user may install in absence of ground-loop-induced interference.

6. In an audio/video duplication facility including a source routing unit having a plurality of inputs and outputs, the source routing unit being operative to receive a signal at one of the inputs and route the signal to one or more of the outputs, and at least one distribution amplifier having an input to receive a signal from an output of the source routing unit and distribute the signal to a block of recording devices, a signal distribution system including user-configurable means to cancel ground-loop-induced interference, the system comprising:

a remote-control master controller having a plurality of control outputs;

a remote-control local controller associated with a block of recording devices, the remote-control local controller having an input to receive a control signal from an output of the remote-control master controller and distribute the control signal to one or more of the recording devices associated with the block; and circuitry-receiving means associated with each output of the remote-control master controller and the input to the remote-control local controller, the circuitry being user-selectable in order to minimize the ground-loop-induced interference, if present in the system.

7. The signal distribution system of claim 6, including one or more recording devices equipped with an infrared remote-control input, the system further comprising:
   a cable from the remote-control master controller to at least one of the recording devices having an infrared remote control input; and
   an infrared emitter connected to the cable where it terminates at the recording device, the emitter being in close proximity to the infrared input, enabling the remote-control master controller to control the recording device on an independent, selective basis.

8. In a signal distribution system characterized in having audio, video and control signals being routed to multiple pieces of equipment over communication paths, the improvement to control ground loops comprising:
   module-receiving means associated with each end of each communication path in the system susceptible to ground-loop-induced interference, the module-receiving means being disposed on a circuit board within a piece of equipment including a standardized connector designed to accept one of a plurality of hardware modules, each module including a mating connector, the modules being chosen by a user of the system in accordance with the degree of interference associated with a particular communication path, the modules from which the user may choose including, at least:
   (a) a module with jumpers in the event that no ground-loop interference is apparent on communication path associated with that module; and
   (b) a module containing isolation circuitry in the event that ground-loop interference is apparent on a communication path associated with that module.

9. The signal distribution system of claim 8, wherein the module containing isolation circuitry further includes a connector to which one end of the communication path attaches directly.

10. The signal distribution system of claim 8, wherein the module containing isolation circuitry includes optoelectronic isolation circuitry to be used in conjunction with a communication path taking the form of an optical fiber.

11. A signal distribution system including user-selectable modules operative to cancel ground-loop interference, the system comprising:
   a source routing unit, comprising:
   an enclosure,
   a plurality of input connectors and a plurality of output connectors disposed on the enclosure, the unit being operative to receive an audio or video signal through one of the input connectors and route the signal to one or more of the output connectors;
   at least one distribution amplifier, comprising:
   an enclosure, and
   an input connector and a plurality of output connectors disposed on the enclosure, the amplifier being operative to receive an audio or video signal through the input connector and route the signal through the output connectors to a block of recording devices;
   cabling which enables a user to route a signal present at an output connector of the source routing unit to the input connector of a distribution amplifier; and
   isolation circuitry receiving means associated with each source routing unit output connector and the input connector of each distribution amplifier, whereby a user may choose among different types of isolation circuits in order to eliminate ground-loop-induced interference, the types of isolation circuits including:
   an isolation transformer,
   an electro-optical coupler, and
   an optical transmitter/receiver when the cabling is in the form of an optical fiber.

12. The signal distribution system of claim 11 wherein the isolation circuitry receiving means associated with the source routing unit is disposed within the source routing unit enclosure.

13. The signal distribution system of claim 11 wherein the isolation circuitry receiving means associated with the distribution amplifier is disposed within the distribution amplifier enclosure.

14. The signal distribution system of claim 11 wherein the isolation circuitry associated with a source routing unit output is in the form of a plug-in module which may be plugged into a routing unit output connector, the module further being adapted to receive one end of a cable, the other end of the cable being attached to the input to an associated distribution amplifier.

15. The signal distribution system of claim 11 wherein the isolation circuitry associated with a distribution amplifier is in the form of a plug-in module which may be plugged into the distribution amplifier input connector, the module further being adapted to receive one end of a cable, the other end of the cable being attached to an output of the source routing unit.

* * * * *